Feb. 2, 1932. H. D. KINNEAR 1,843,682
SHOCK ABSORBER
Filed July 14, 1928 2 Sheets-Sheet 1
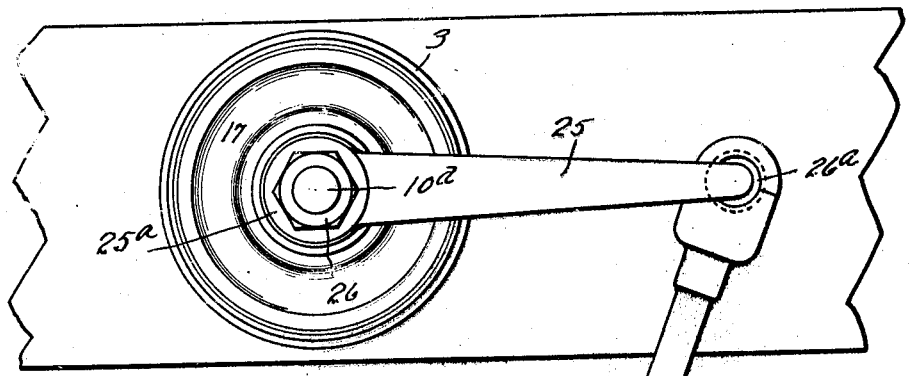
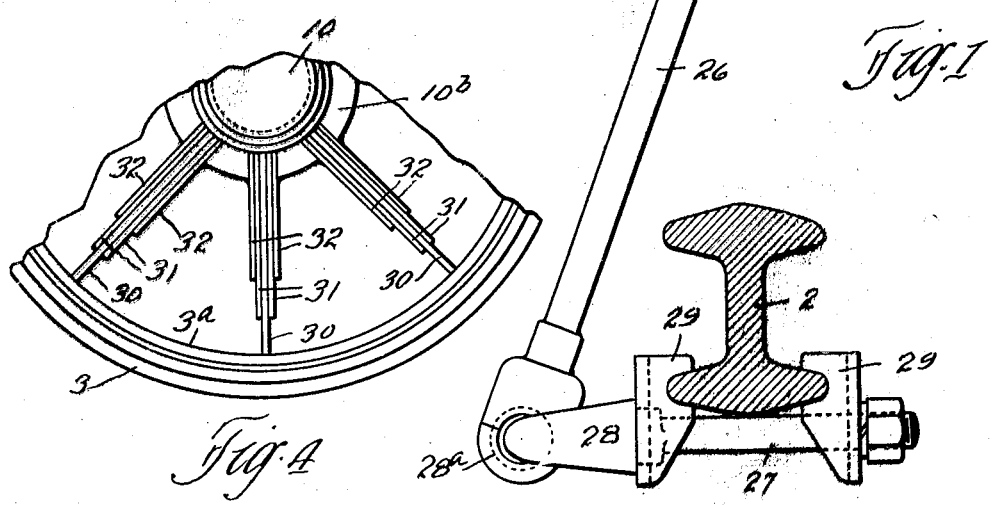
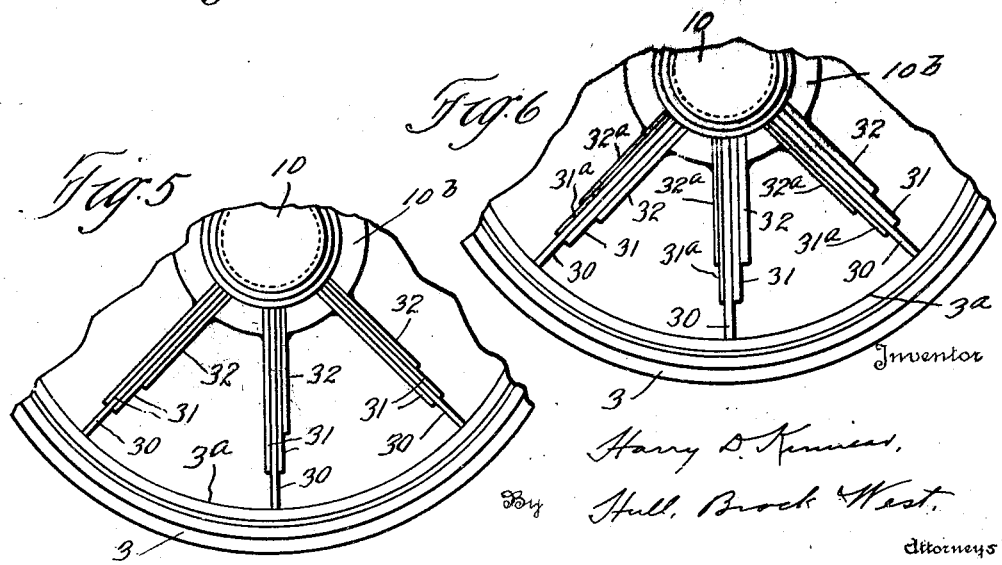

Feb. 2, 1932.  H. D. KINNEAR  1,843,682

SHOCK ABSORBER

Filed July 14, 1928  2 Sheets-Sheet 2

Inventor
Harry D. Kinnear
By Hull, Brock & West
Attorneys

Patented Feb. 2, 1932

1,843,682

UNITED STATES PATENT OFFICE

HARRY D. KINNEAR, OF CLEVELAND, OHIO, ASSIGNOR TO THE GABRIEL COMPANY, OF CLEVELAND, OHIO, A CORPORATION OF OHIO

SHOCK ABSORBER

Application filed July 14, 1928. Serial No. 292,676.

This invention relates to shock absorbers of the hydraulic type wherein a yieldable vane or blade is carried by a shaft mounted in a cylindrical casing, the oscillatory movements of the shaft being resisted by the action of the liquid in the casing to the movements of the vane or blade.

It is the general purpose and object of the invention to improve the efficiency of devices of this character. A more limited object of the invention is to provide a device of this character with an arrangement of yieldable vanes or blades which will adapt the shock absorber for varying conditions of use.

Figure 2:
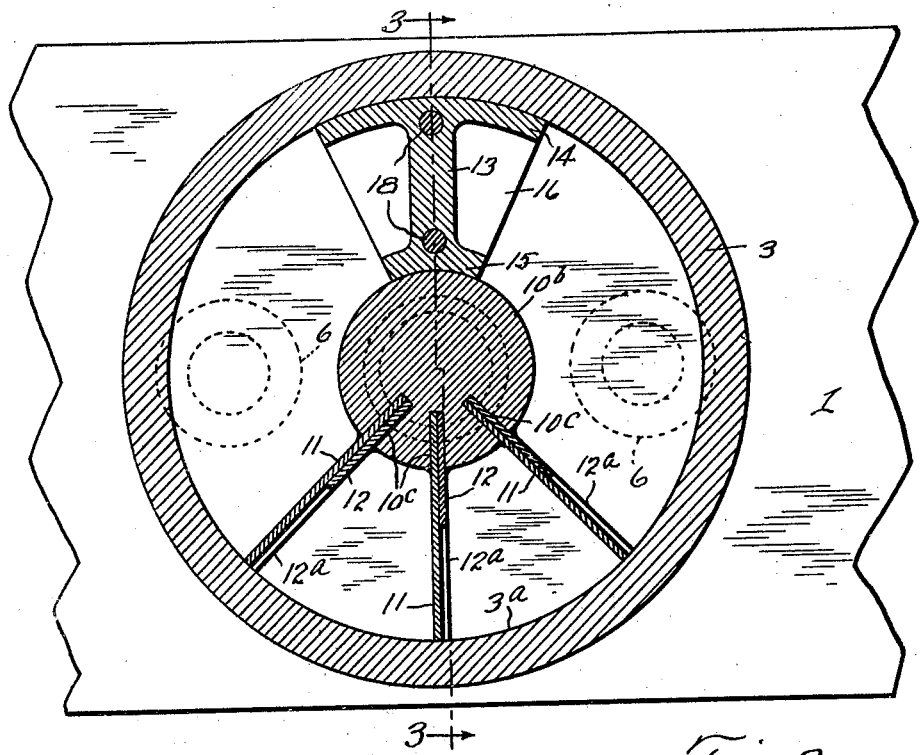
Figure 3:
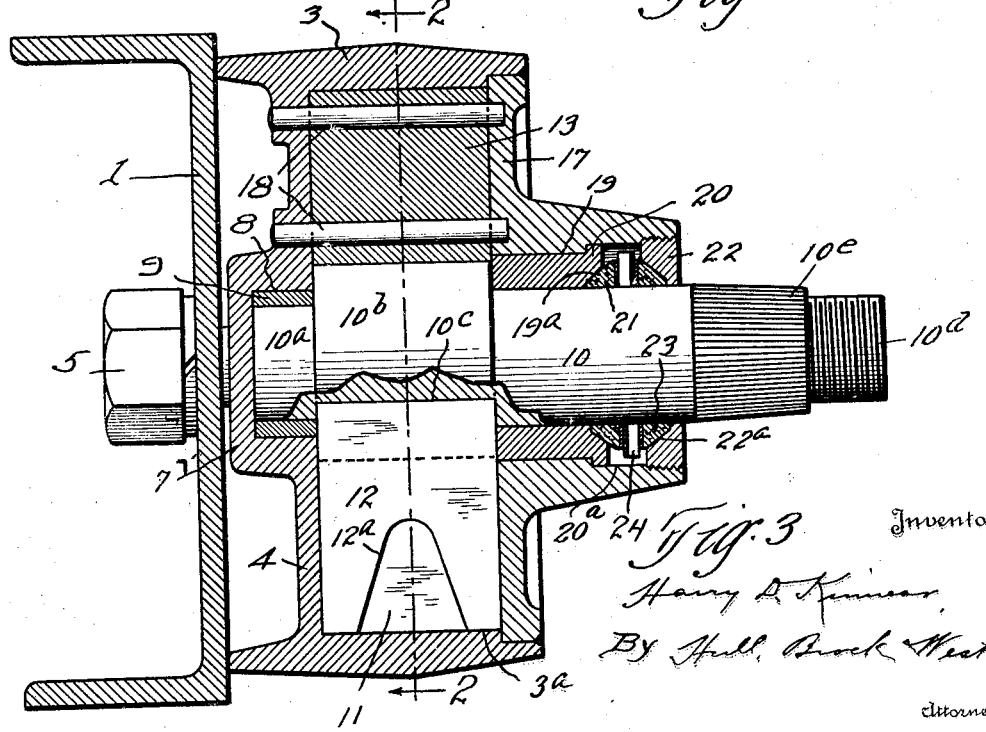

I accomplish the foregoing objects, the other and more limited objects which will appear hereinafter, in and through the construction and arrangement of parts shown in the drawings, wherein Fig. 1 represents a side elevation of a shock absorber constructed in accordance with my invention and showing the manner in which it is applied to one of the side members and the axle of an automobile; Fig. 2 a sectional view through the shock absorber, said view corresponding to the line 2—2 of Fig. 3; Fig. 3 a sectional view through the shock absorber, the view corresponding to the line 3—3 of Fig. 2; and Figs. 4, 5 and 6 are details in elevation, with cover removed, each showing a modification of the invention disclosed in Figs. 1 to 3 inclusive.

Describing the various parts herein by reference characters and first in connection with Figs. 1 to 3, 1 denotes one of the side frame members and 2 an axle of an automobile. The shock absorber comprises a substantially cylindrical casing 3 having a bottom 4 which is secured to the side member 1 by means of bolts 5 threaded into bosses 6 carried by the bottom. The casing bottom is provided, between the bosses 6, with a central boss 7 provided with a cylindrical seat 8 for an antifriction bushing 9 in which the inner reduced end 10$^a$ of a shaft 10 is journaled. The shaft 10 is provided within the casing 3 with an enlarged cylindrical portion 10$^b$, said cylindrical portion being co-extensive with the depth of the liquid chamber provided between the top and the bottom of the casing and being provided with radially extending slots 10$^c$ in which the inner ends of the duplex vanes 11, 12 are seated. Three such duplex vanes are shown and extend from the shaft outwardly toward and in close proximity to the inner cylindrical wall 3$^a$ of the casing. One such duplex vane 11, 12, is arranged centrally with respect to the other two vanes and is shown as spaced equidistantly therefrom.

Each vane member 11 consists of a blade of spring metal rectangular in shape and of a width equal to the depth of the cylindrical chamber within the casing 3. Except when subjected to the pressure of the liquid in the casing, the outer end of each of these vane members is in substantial engagement with the inner wall 3$^a$ of the casing.

Each vane member 12 is also formed of spring metal and has its outer end provided with a V-shaped notch 12$^a$, thus reducing the effective width of the end of each of these vane members whereby the end of each member 12 terminates in a pair of prongs the width of each of which decreases gradually from the inner toward the outer end of the said member. As shown in Fig. 2, the vane members 12 are on the same sides of the vane members 11 with which they respectively cooperate.

Opposite the central vane is an abutment or partition comprising a radial wall 13 merging at its outer end with a wide segmental flange 14 and at its inner end with a narrower segmental flange 15. The flange 14 is adapted to bear against the inner wall 3$^a$ of the cylindrical casing and the inner face of the flange 15 to engage and conform to the cylindrical surface 10$^b$ of the shaft 10. Preferably formed with the wall 13 and the flanges 14 and 15 are bottom and top segmental flanges 16 which are adapted to engage the bottom of the casing 3 and the under side of the cover 17. The abutment or partition is conveniently secured in place by means of pins 18 extending through the bottom wall 4 of the casing, through the radial wall 13, and having their outer ends anchored in seats provided therefor in the cover.

The cover is provided with a hub 19 having in the inner end thereof an anti-friction bushing 20 which surrounds the shaft 10 and also having an enlarged cylindrical seat 20ª beyond the bushing. The outer end of the bushing is provided with an inwardly tapered seat 19ª for a packing ring 21. A screw plug 22 is threaded into the outer end of the recess 20ª and has an inwardly tapered seat 22ª for a packing ring 23, similar to the packing ring 21. A radially corrugated washer 24 is interposed between the packing rings. The construction covered by the parts 19—24 provides an efficient stuffing box to prevent leakage of the liquid to and around the shaft.

The outer portion of the shaft is provided with a tapered seat 10ᶜ for the hub 25ª of an arm 25, the said hub being held in place by means of a nut 26 threaded upon the outer end 10ᵈ of the shaft.

For the purpose of checking the movements of the members 1 and 2 toward and from each other, the arm 25 is connected by a connecting rod 26 to a bracket 28 projecting from one end of a bolt which secures a pair of clamps 29 to the axle 2. The outer end of the arm 25 is connected to the upper end of the arm 26 by a ball-and-socket connection, indicated generally at 26ª, and the lower end of the arm 26 is connected in like manner to the end of the bracket 28, as indicated at 28ª. The particular manner of connecting the arm 26 to the bracket 28 forms no part of the invention covered herein; hence a detailed description of such connections is unnecessary.

With the parts constructed and arranged as described, it is believed that the operation will be readily understood. Let it be assumed that the shaft 10 begins to rotate in a clockwise direction, as indicated by the arrow on Fig. 2. This causes the vanes 11 to compress the liquid between them and the abutment 13—16. The outer ends of the vanes 11 will yield, this yielding movement being proportional to the strength of the rotary movement imparted to the shaft 10, the outer ends of the vanes flexing and providing a passage therearound for the liquid. It will be evident that the left hand vane member 11 will be subjected to the greatest pressure, the intermediate vane 11 to a considerably less pressure, and the right hand vane member 11 to still less pressure. The flexing of the outer ends of each of the vane members 11 will be yieldingly resisted by the forked ends 12ª of the vane members 12.

When the shaft is rotated in the opposite direction, the notches 12ª provided in the vane members 12 will allow the liquid to press against the outer ends of the vane members 11 and permit the outer ends of said vane members to flex or yield without any backing action of the members 12. By this arrangement, a considerably greater resistance will be offered to the rotation of the shaft 10 in a clockwise direction than in a counter-clockwise direction. If desired, the arrangement of the vane members 11 and 12 may be reversed on one or more of the duplex vanes so that both members of two of the duplex vanes may jointly resist the movement of rotation of the shaft 10 in one direction, while both members of the other duplex vane will jointly resist such movement in the opposite direction.

In Fig. 4 there is shown a modification of the invention wherein each complete vane comprises a central spring plate 30 which extends from the shaft to the inner wall 3ª of the casing as well as from the top to the bottom of the casing. This central spring plate is reinforced by a pair of shorter spring plates 31, 31, on opposite sides thereof and having their inner ends seated in the part 10ᵇ of the shaft and their outer ends spaced inwardly from the outer end of the plate 30. In addition, a pair of shorter spring plates 32 are applied, one to each of the plates 31 and each having its inner end mounted in the hub portion 10ᵇ of the shaft. Three such compound or laminated vanes are shown, each vane extending radially from the hub portion 10ᵇ of the shaft and said vanes being shown as equidistantly spaced. As shown herein, both plates 31 are of the same length and width, as are also both plates 32. As the shaft is rotated in either direction, the outer ends of the blades 30 will flex, permitting liquid to pass therearound. This flexing action will be yieldingly resisted by the spring plates 31, 32 on the side of each blade 30 which is being compressed. The particular blade or vane member 30 which is nearest the abutment toward which the vanes are being moved will offer the greatest resistance to such movement, as the next or second vane will be subjected to the pressure of liquid passing around such first vane and the third vane to such pressure of liquid which passes around the end of the second vane. With the arrangement as shown in Fig. 4, equal resistance will be offered to rotary movements of equal strength of the shaft in opposite directions.

In Fig. 5 there is shown a modification of the invention in which greater resistance will be opposed to the movements of the shaft in a clockwise direction than in a counter-clockwise direction. In this modification, the spring plates 30 and 31 are of the same construction and mounted in the same manner as is the case with the like-numbered plates in Fig. 4. However, only one spring plate 32 is employed, and this spring plate is shown as located on the side of each vane which will cause the said vane to offer greater resistance to rotary movement of the shaft in a clockwise direction than in a counter-clockwise direction.

In Fig. 6 there is shown a still further modification in which the vane members 30, 31 and 32 are identical with those shown in Figs. 4 and 5. However, the vane members 31ª and 32ª on the opposite sides of the vane members 30 from the members 31 and 32 are thinner or lighter than the members 31 and 32. With this construction, the outer end of each vane member 30 can flex more easily when the shaft is rotated in a counter-clockwise direction than when it is rotated in a clockwise direction, as the members 31ª and 32ª will flex or yield more easily than the members 31 and 32.

In all forms of my invention, a vane assembly is provided wherein a plurality of liquid-containing pockets or chambers are provided between the vane members. These pockets are of such depth that, under a quick movement of the vane assembly in either direction, turbulence will be created in the liquid in the pockets or chambers creating a centrifugal action which will press the liquid outwardly against the inner wall 3ª of the casing, thereby increasing the efficiency of the oil seal provided between the ends of the vane members and such inner wall. This enables me to avoid close tolerance between the outer ends of the vane members and the inner wall of the casing. Furthermore, it enables me to use thinner blades 11 and 30 than could be used except for the action of the liquid referred to. The use of such lighter weight blades and the avoidance of close tolerance permits free action of the vehicle springs under ordinary or comparatively smooth riding conditions.

As the shaft rotates, the liquid will flow from what will then be the front pocket around the intermediate vane member into what will then be the rear pocket. This enables the liquid to be built up in such second or rear pocket, thereby to insure a final efficient seal around the end of the then rearmost vane member or blade.

Having thus described my invention, what I claim is:

1. A hydraulic shock absorber comprising a liquid containing casing, a shaft in said casing and a plurality of radially extending angularly spaced vanes carried by said shaft and providing therebetween a plurality of liquid containing chambers, the outer portion of each of said vanes being resilient thereby to provide a variable passage around the outer end of each such vane and the inner wall of the casing, due to the resistance offered to each such vane by the liquid within the casing, the said casing being provided with walls toward and from which the said vanes are moved by rotation of said shaft in opposite directions respectively.

2. A hydraulic shock absorber comprising a liquid containing casing, a shaft in said casing, and a plurality of radially extending angularly spaced vanes carried by said shaft and providing therebetween a plurality of liquid containing chambers, the outer portion of each of said vanes being resilient thereby to provide a variable passage around the outer end of each such vane and the inner wall of the casing, due to the resistance offered to each such vane by the liquid within the casing, spring plates extending radially from said shaft, each such plate bearing against one of the faces of each of said vanes thereby to increase the resistance to flexing in one direction offered by each of said vanes, the said casing being provided with walls toward and from which the said vanes are moved by rotaiton of said shaft in opposite directions respectively.

3. A hydraulic shock absorber comprising a liquid containing casing, a shaft in said casing, and a plurality of radially extending angularly spaced vanes carried by said shaft and providing therebetween a plurality of liquid containing chambers, the outer portion of each of said vanes being resilient thereby to provide a variable passage around the outer end of each such vane and the inner wall of the casing, due to the resistance offered to each such vane by the liquid within the casing, plates extending radially from said shaft, the said plates bearing against opposite faces of each of said vanes and each such plate having a resilient outer end thereby to increase the resistance to flexing in one direction offered by each of said vanes, the said casing being provided with walls toward and from which the said vanes are moved by rotation of said shaft in opposite directions respectively.

In testimony whereof, I hereunto affix my signature.

HARRY D. KINNEAR.